United States Patent
Mitsuzawa et al.

(10) Patent No.: US 9,279,062 B2
(45) Date of Patent: Mar. 8, 2016

(54) INK SET AND IMAGE FORMING METHOD

(71) Applicant: Seiko Epson Corporation, Tokyo (JP)

(72) Inventors: Kana Mitsuzawa, Shiojiri (JP); Toru Saito, Yamagata-mura (JP); Masakazu Ohashi, Shiojiri (JP); Makoto Furue, Saitama (JP)

(73) Assignee: SEIKO EPSON CORPORATION, Tokyo (JP)

( * ) Notice: Subject to any disclaimer, the term of this patent is extended or adjusted under 35 U.S.C. 154(b) by 459 days.

(21) Appl. No.: 13/684,711

(22) Filed: Nov. 26, 2012

(65) Prior Publication Data

US 2013/0135382 A1    May 30, 2013

(30) Foreign Application Priority Data

Nov. 25, 2011 (JP) ................. 2011-257813

(51) Int. Cl.
| | | |
|---|---|---|
| *B05D 1/36* | (2006.01) | |
| *C09D 11/40* | (2014.01) | |
| *C09D 175/04* | (2006.01) | |
| *C09D 133/08* | (2006.01) | |
| *C09D 133/12* | (2006.01) | |
| *C09D 11/322* | (2014.01) | |

(52) U.S. Cl.
CPC .............. *C09D 11/40* (2013.01); *C09D 11/322* (2013.01); *C09D 133/08* (2013.01); *C09D 133/12* (2013.01); *C09D 175/04* (2013.01)

(58) Field of Classification Search
None
See application file for complete search history.

(56) References Cited

U.S. PATENT DOCUMENTS

| | | | |
|---|---|---|---|
| 2003/0105187 A1 | 6/2003 | Iijima | |
| 2007/0060670 A1* | 3/2007 | Ellis | ............................ 523/160 |
| 2010/0091052 A1 | 4/2010 | Ogawa et al. | |

FOREIGN PATENT DOCUMENTS

| | | |
|---|---|---|
| JP | 2001106951 A | 4/2001 |
| JP | 2007-084636 A | 4/2007 |
| JP | 2009-030014 A | 2/2009 |
| JP | 2009-508717 A | 3/2009 |
| JP | 2010-120990 A | 6/2010 |
| WO | 2007-035508 A1 | 3/2007 |

OTHER PUBLICATIONS

Machine Translation of JP 2010-120990 A to Fushima et al.*

* cited by examiner

*Primary Examiner* — Vu A Nguyen
(74) *Attorney, Agent, or Firm* — Nutter McClennen & Fish LLP; John J. Penny, Jr.

(57) ABSTRACT

An ink set includes a white ink jet pigment ink and a non-white ink jet pigment ink containing a diene copolymer.

9 Claims, No Drawings

INK SET AND IMAGE FORMING METHOD

The entire disclosure of Japanese Application No.: 2011-257813 filed on Nov. 25, 2011 is expressly incorporated by reference herein.

BACKGROUND

1. Technical Field

The present invention relates to an ink set and an image forming method.

2. Related Art

Various techniques are applied to recording methods for forming images on a recording medium, such as paper, according to image data signals. In ink jet techniques of such techniques, images can be formed directly on a recording medium by ejecting an ink only onto desired image portions, using an inexpensive apparatus. Accordingly, ink jet techniques can efficiently use inks and reduce running costs. In addition, little noise is produced when the ink jet technique is used, and the ink jet technique is thus advantageous as a recording method.

In recent years, approaches using an ink jet technique have been attempted for forming glossy images having high water fastness and rub fastness on the surface of a recording medium by ejecting an ink onto a recording medium.

For example, JP-A-2010-120990 discloses a technique for printing on plain paper using an ink jet recording ink containing 40.0 parts by weight of carbon black pigment dispersion (pigment content: 20%), 5.5 parts by weight of glycerol, 16.5 parts by weight of 1,3-butanediol, 2.0 parts by weight of 2-ethyl-1,3-hexanediol, 2.5 parts by weight of fluorochemical surfactant (solid content: 40%), 10.0 parts by weight of self-emulsifying polyurethane resin emulsion (solid content: 30%), 6.0 parts by weight of carboxy-modified methylmethacrylate-butadiene copolymer resin (MBR, solid resin content: 50%), and 17.0 parts by weight of distilled water (paragraph 0030, Example 1).

JP-A-2001-106951 (paragraphs 0042 to 0044, and 0052) discloses a technique for printing on plain paper using an ink jet aqueous pigment ink prepared by adjusting a mixture of materials to 1000 g with ion exchanged water, the materials including 167 g of yellow pigment dispersion (average particle size of the pigment, 75 nm), 71.4 g of latex (Nipol SX 1503 produced by Zeon Corporation, average particle size: 60 nm, content: 3% by weight), 200 g of ethylene glycol, 120 g of diethylene glycol, 4 g of wetting agent (Olfine 1010 produced by Nissin Chemical Industry), and 2 g of preservative (Proxel GXL produced by Zeneca).

However, images formed with the black or yellow ink of the above-cited patent documents on plain paper by an ink jet recording method may crack or stain and thus be nonuniform, and may be poor in color developability.

SUMMARY

An advantage of some aspects of the invention is that it provides an ink set that can exhibit superior color developability and an image forming method using the ink set.

The present inventors have conducted intensive research to solve the above issue, and found that if printing is performed with a non-white ink jet color pigment ink on a recording medium, particularly on a colored recording medium, the resulting image exhibits poor color developability. Then, the inventors found that the use of an ink set including a non-white ink jet pigment ink containing a diene copolymer and a white ink jet pigment ink leads to a high color developability.

According to an aspect of the invention, an ink set having the following features is provided.

An ink set includes a white ink jet pigment ink and a non-white ink jet pigment ink containing a diene copolymer.

At least either the white ink jet pigment ink or the non-white ink jet pigment ink may contain at least either a urethane resin or an acrylic resin.

The urethane resin and the acrylic resin may have an elongation at break of 200% to 500%, an elastic modulus of 20 to 400 MPa, and a glass transition temperature of $-10°$ C. or less.

The diene copolymer content may be 0.5% to 3% by mass relative to the total mass of the non-white ink jet pigment ink.

The diene copolymer may be methylmethacrylate-butadiene rubber.

According to another aspect of the invention, an image forming method is provided which includes forming an image on a recording medium by an ink jet recording method using the above-described ink set.

The forming of an image may include depositing the white ink jet pigment ink on the recording medium to form an white ink layer and subsequently depositing the non-white ink jet pigment ink on the white ink layer, and heating the recording medium on which the white ink jet pigment ink and the non-white ink jet pigment ink have been deposited.

DESCRIPTION OF EXEMPLARY EMBODIMENTS

Embodiments of the invention will now be described in detail. The invention is not limited to the following embodiments, and various modifications may be made within the scope and spirit of the invention.

"Non-white" mentioned herein refers to colors other than white. A "recorded article" mentioned herein refers to a thing including a recording medium and an image formed on the medium by recording with an ink. A "printed cloth" mentioned herein is a type of recorded article, and refers to a thing including cloth as a recording medium and an image formed on the cloth by recording with an ink.

The term "color developability" used herein refers to the characteristic of non-white inks exhibiting gloss on a recording medium. The "rub fastness" used herein is calculated from the optical densities (OD values) of the record surface of a recorded article before and after applying a friction force to the record surface. In the calculation, the OD value before applying the friction force is the denominator, and the OD value after applying the friction force is the numerator. A high rub fastness implies a high fixation. The term "washing fastness" refers to a property showing the degree of discoloration of a recorded article, and a high washing fastness implies that the recorded article is discolored little by washing.

In the description, the term "(meth)acrylate" refers to at least either an acrylate or the corresponding methacrylate, and "(meth)acrylic" compound refers to at least either an acrylic compound or the corresponding methacrylic compound. "(Meth)acryloyl" refers to at least either an acryloyl or a corresponding methacryloyl.

Ink Set

The ink set according to an embodiment of the invention includes a white ink jet pigment ink (hereinafter simply referred to as white ink) and a non-white ink jet pigment ink (hereinafter simply referred to as non-white ink) containing a diene copolymer. When a non-white image is formed on a base coat made of a white ink, the non-white ink containing a diene copolymer can exhibit superior color developability on the white ink. Furthermore, by applying the non-white ink over the surface of a base coat of the white ink, a high-quality non-white ink image can be formed even on a colored recording medium.

Examples of the non-white ink include, but are not limited to, color inks, black inks, and gray inks. Color inks include, but are not limited to, cyan inks, magenta inks, yellow inks, light cyan inks, light magenta inks, light yellow inks, red inks, green inks, blue inks, and black inks.

The non-white ink of the ink set may be composed of any one of the above inks, or may be a combination of two or more of the above inks. Also, the white ink of the ink set may be composed of a white ink or may be a combination of two or more white inks having different compositions.

Preferably, the non-white ink is an aqueous ink containing a pigment.

The ink jet pigment inks (hereinafter often collectively referred to as the ink(s)) constituting the ink set will now be described in detail.

Pigments

The pigments contained in the inks can be selected from inorganic pigments and organic pigments.

White pigments that can be used in the white ink include, but are not limited to, inorganic white pigments, such as titanium oxide, zinc oxide, zinc sulfide, antimony oxide, and zirconium oxide. In addition to these inorganic white pigments, organic white pigments may be used, such as white hollow resin particles and polymer particles.

White pigments designated by color index (C.I.) numbers include, but are not limited to, C.I. Pigment Whites 1 (basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (titanated mica), 21 (barium sulfate), 22 (natural barium sulfate), 23 (gloss white), 24 (alumina white), 25 (gypsum), 26 (magnesium oxide-silicon oxide), 27 (silica), and 28 (anhydrous calcium silicate).

Among those, titanium oxide is preferred because it is superior in color developability and hiding power, and can have a satisfactory particle size in dispersion and result in high visibility (lightness).

Preferably, titanium oxide is of rutile type, which is a typical white pigment. The rutile-type titanium oxide may be prepared in a laboratory, or obtained from commercially available products. For preparing the rutile-type titanium oxide (powder) in a laboratory, a known sulfate method or chloride method can be applied.

Commercially available products of rutile-type titanium oxide include Tipaques (registered trademark) CR-60-2, CR-67, R-980, R-780, R-850, R-980, R-630, R-670, and PF-736 (each produced by Ishihara Sangyo Kaisha, Ltd.)

The 50% average particle size (D50) of titanium oxide is preferably 50 to 500 nm, and more preferably 150 to 350 nm. An ink containing titanium oxide having such an particle size can exhibit high rub fastness, and can form high-quality images having high visibility.

The "50% average particle size (D50) of titanium oxide" mentioned herein refers to the D50 of titanium oxide in an ink, but not the D50 before preparation of the ink. The "50% average particle size" mentioned herein refers to a sphere-equivalent 50% average particle size measured by a dynamic light scattering method, and can be obtained by the following process.

Diffracted/scattered light generated by irradiating particles in a disperse medium with light is measured with detectors disposed in front, side and back of the disperse medium. With the assumption that particles, which are naturally indefinite in shape, are spherical, an accumulation curve is obtained from the measurement results, wherein the total volume of the spherical particles calculated from the volumes of measured particles is 100%, and the point where the cumulative value is 50% is defined as the sphere-equivalent 50% average particle size (D50) by a dynamic light scattering method.

If titanium oxide is used as the white pigment, the titanium oxide is preferably surface-treated with alumina-silica to suppress the photocatalytic function of the titanium oxide. In this instance, the amount of surface-treating agent (amount of alumina-silica) can be about 5% to 20% by mass relative to the total mass (100% by mass) of the surface-treated white pigment.

Non-white pigments that can be used in the non-white ink, that is, pigments other than white pigments, include, but are not limited to, organic pigments of azo, phthalocyanine, dye, condensed polycyclic, nitro and nitroso compounds (such as Brilliant Carmine 6B, Lake Red C, watching red, disazo yellow, Hansa Yellow, phthalocyanine blue, phthalocyanine green, alkali blue, and aniline black), metals and metal oxides or sulfides of cobalt, iron, chromium, copper, zinc, lead, titanium, vanadium, manganese and nickel, carbon blacks (C.I. Pigment Black 7) such as furnace carbon black, lampblack, acetylene black and channel black, and other inorganic pigments such as ocher, ultramarine blue and Prussian blue.

More specifically, examples of the carbon black that can be used in the black ink include No. 2300, No. 900, MCF 88, No. 33, No. 40, No. 45, No. 52, MA 7, MA 8, MA 100 and No. 2200B (each product name, produced by Mitsubishi Chemical Corporation); Raven 5750, Raven 5250, Raven 5000, Raven 3500, Raven 1255 and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (each product name, produced by Cabot Corporation); and Color Black FW 1, Color Black FW 2, Color Black FW 2V, Color Black FW 18, Color Black FW 200, Color Black S150, Color Black S160, Color Black S170, Printex 35, Printex U, Printex V, Printex 140U, Special Black 6, Special Black 5, Special Black 4A and Special Black 4 (each product name, produced by Degussa).

Pigments that can be used in the yellow ink include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

Pigments that can be used in the magenta ink include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245 and 245, and C.I. Pigment Violets 19, 23, 32, 33, 36, 38, 43 and 50.

Pigments that can be used in the cyan ink include C.I. Pigment Blues 1, 2, 3, 15, 15:1, 15:2, 15:3, 15:34, 15:4, 16, 18, 22, 25, 60, 65 and 66, and C.I. Vat Blues 4 and 60.

Pigments for colors other than magenta, cyan and yellow include C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The above non-white pigments may be used singly or in combination.

The pigment content in an ink depends on the type of the pigment to be used, but is preferably 1% to 30% by mass, more preferably 1% to 15% by mass, relative to the total mass of the ink (100% by mass) from the viewpoint of ensuring a high color developability. In particular, the titanium oxide content is preferably 1% to 20% by mass, more preferably 5% to 13% by mass, relative to the total mass of the ink (100% by mass) because an ink having such a titanium oxide content does not easily settle and can exhibit high hiding power and color reproduction (particularly on black recording media).

The above-described white pigments may be used singly or in combination, and the above non-white pigments may also be used singly or in combination.

The non-white ink may contain a white pigment and the white ink may contain a non-white pigment, to the extent of not departing from the spirit of the invention.

Pigment Dispersions

In each ink, the pigment may be dispersed, that is, may be present in the form of pigment dispersion. The particle size D50 of the pigment in the pigment dispersion is preferably 50 nm to 1 μm. When the D50 is 50 nm or more, the resulting recorded article can maintain a high color developability. When the D50 is 1 μm or less, the fixation of the ink or pigment can be satisfactorily maintained. If the white pigment is in a dispersion, the white pigment particles in the white pigment dispersion preferably have a D50 of 100 to 600 nm, and more preferably 200 to 500 nm. When the D50 in the white pigment dispersion is 100 nm or more, the hiding power and color developability of the ink can be satisfactorily maintained. When the D50 is 1 μm or less, the fixation of the ink or pigment can be satisfactorily maintained, and the ink can be stably ejected from an ink jet head. If the non-white pigment is in a dispersion, the non-white ink particles in the non-white ink dispersion preferably have a D50 of 70 to 230 nm, and more preferably 80 to 130 nm.

The pigment in the pigment dispersion may be, but is not limited to, of self-dispersing type or resin-dispersed type.

Self-Dispersing Pigment

The self-dispersing pigment can be dispersed or dissolved in an aqueous medium without a dispersant. The phrase "dispersed or dissolved in an aqueous medium without a dispersant" implies that the pigment is stably present in the aqueous medium because of the presence of hydrophilic groups at the surfaces of the pigment particles, even if a dispersant is not used for dispersing the pigment. Accordingly, the ink is hardly foamed because there is no need to use a dispersant, which may degrade the defoaming property of the ink. Consequently, the ink can be stably ejected. Also, a significant increase in viscosity resulting from the presence of a dispersant does not occur. Accordingly, the ink can be easily handled, and, for example, a large amount of pigment can be added to increase the print density.

Examples of the above-mentioned hydrophilic group include —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, and —$NR_3$ (where M represents hydrogen, an alkali metal, ammonium, a substituted or unsubstituted phenyl group, or an organic ammonium, and R represents an alkyl group having a carbon number of 1 to 12, or a substituted or unsubstituted naphthyl group). The self-dispersing pigment preferably has one or more of these hydrophilic groups.

In particular, self-dispersing carbon blacks can impart a still higher color developability to printed cloth and are thus suitably used. For dispersing carbon black in water without using a dispersant, the surfaces of carbon black particles may be oxidized with, for example, ozone or sodium hypochlorite, but the method is not limited to this. Preferably, the self-dispersing carbon black in a dispersion has a D50 of 50 to 300 nm, more preferably 50 to 150 nm, still more preferably 70 to 130 nm, and still further preferably 80 to 120 nm. When the D50 of the self-dispersing carbon black is 50 nm or more, high color developability can be maintained. When the D50 of the self-dispersing carbon black is 300 nm or less, the resulting printed cloth can exhibit a still higher color developability. When the D50 is 150 nm or less, the fixation of the ink or pigment can be satisfactorily maintained.

The self-dispersing pigment can be prepared, for example, by physical treatment or chemical treatment for binding (grafting) the above-mentioned hydrophilic groups to the surfaces of the pigment particles. For the physical treatment, vacuum plasma treatment may be performed. For the chemical treatment, wet oxidation may be performed in which the surfaces of the pigment particles are oxidized with an oxidizing agent in water, or p-aminobenzoic acid may be bound to the surfaces of the pigment particles in such a manner that the carboxy group is bound to the surfaces with the phenyl group therebetween.

Resin-Dispersed Pigment

The resin-dispersed pigment refers to a pigment that can be dispersed by the function of a resin. Although any resins (polymers) can be used as a dispersant polymer in a resin-dispersed pigment, the dispersant polymer used for dispersing the pigment preferably has a glass transition temperature Tg of 55° C. or less, more preferably 50° C. or less. Polymers having a Tg of 55° C. or less can enhance the fixation of the pigment or ink. Preferably, the weight average molecular weight (in terms of polystyrene) measured by gel permeation chromatography (GPC) is in the range of 10,000 to 200,000. Polymers having such a molecular weight can enhance the storage stability of the ink.

The term "weight average molecular weight (Mw)" mentioned herein refers to a polystyrene equivalent weight average molecular weight measured by gel permeation chromatography (GPC) using L7100 System manufactured by Hitachi.

The polymer may contain 70% by mass or more of a (meth)acrylate-(meth)acrylic acid copolymer. Such a polymer leads to an ink that can exhibit superior fixability and glossiness. Preferably, at least either an alkyl(meta)acrylate having a carbon number of 1 to 24 or a cyclic alkyl(meta)acrylate having a carbon number of 3 to 24 accounts for 70% by mass or more of the total monomers forming the polymer. Examples of such an alkyl (meta)acrylate or cyclic alkyl (meta)acrylate include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. In addition, other components may be added, such as hydroxyethyl (meth)acrylate, hydroxypropyl (meth)acrylate, diethylene glycol (meth)acrylate and other hydroxy (meth)acrylates having a hydroxy group, urethane (meth)acrylate, and epoxy (meth)acrylate.

Polymer-Coated Pigment

Among resin-dispersed pigments, preferred are pigments coated with a polymer (microencapsulated pigments). Such a pigment leads to an ink that can exhibit still higher fixation, glossiness and color reproduction.

The polymer-coated pigment is prepared by phase inversion emulsification. More specifically, any of the above-cited polymers is dissolved in an organic solvent, such as methanol, ethanol, isopropanol, n-butanol, acetone, methyl ethyl ketone, or dibutyl ether. A pigment, and subsequently a neutralizer and water are added into the polymer solution. The mixture is stirred so that the materials are sufficiently dispersed, and thus an oil-in-water type dispersion is prepared. The organic solvent of the resulting dispersion is removed to yield a polymer-coated pigment in the form of dispersion in water. The stirring for dispersion can be performed using a ball mill, a roll mill, a bead mill, a high-pressure homogenizer, or a high-speed stirring disperser.

Preferred examples of the neutralizer include ethylamine, trimethylamine and other tertiary amines, lithium hydroxide, sodium hydroxide, potassium hydroxide, and ammonia, and preferably, the neutralizer is such that the resulting dispersion of the polymer-coated pigment have a pH of 6 to 10.

Preferably, the polymer coating the pigment has a weight average molecular weight (measured by GPC) of about 10,000 to 150,000 from the viewpoint of stably dispersing the pigment.

In particular, polymer-coated color pigments are suitably used. The use of a polymer-coated color pigment leads to a printed cloth exhibiting a still higher color developability.

Diene Copolymer

The non-white ink contains a diene copolymer, that is, a diene rubber latex. The diene copolymer in a non-white ink enhances the binding capacity (adhesion) between a non-white ink layer and a white ink layer (base coat) irrespective of the properties of the white ink forming the base coat. Consequently, the non-white ink exhibits a high color developability.

The inks of an embodiment of the invention each may contain a surfactant and a binder resin (other than the diene copolymer) as will be described later. However, if the surfactants or binders are different between the non-white ink and the white ink, the white ink may repel the non-white ink. If the non-white ink is repelled, the pigment and resin in the non-white ink can form aggregation, or the coating of the non-white ink may crack. Consequently, the white base coat of the recorded article may be undesirably exposed. By adding a diene copolymer to the non-white ink, the non-white ink can be prevented from being repelled.

When an image is formed with the ink set of an embodiment of the invention, it is preferable that the image formed with a non-white ink be heated. However, such heating treatment causes the non-white ink to be repelled as above, and results in a pinhole that will expose the white base coat. By adding a diene copolymer to the non-white ink, the non-white ink is prevented from being repelled as described above, so that a pinhole can be prevented.

Exemplary diene copolymers include, but are not limited to, styrene-butadiene rubber (SBR), methyl methacrylate-butadiene rubber (MBR), and acrylonitrile-butadiene rubber (NBR). MBR can particularly enhance the color developability of the non-white ink and is accordingly suitable.

Those diene copolymers may be used singly or in combination.

Preferably, the diene copolymer content is 0.5% to 3% by mass, more preferably 0.8% to 1.5% by mass, relative to the total mass of the non-white ink (100% by mass). When the diene copolymer content is 0.5% by mass or more, the non-white ink can exhibit still higher color developability. When the diene copolymer content is 3% by mass or less, the ink can be stably stored at high temperatures.

The white ink also may contain a diene copolymer to the extent of not departing from the spirit of the invention.

Binder Resin

In an embodiment, at least either the white ink or the non-white ink of the ink set may contain at least either a urethane resin or an acrylic resin as a binder resin (other than the diene copolymer, as described above). If the white ink contains such a binder rein, the layer of the white ink (base coat) can exhibit high fixation to the recording medium, and consequently, the rub fastness of the resulting recorded article can be enhanced. If the non-white ink contains such a binder rein, the layer of the non-white ink (overlying coat) can exhibit high fixation to the base coat of the white ink, and consequently, the rub fastness of the resulting recorded article can be enhanced.

In particular, by enhancing the fixation of the white ink (base coat) to the recording medium, the rub fastness of the recorded article can be enhanced more effectively. Preferably, the white ink contains a urethane resin. More preferably, the white ink contains a urethane resin and the non-white ink contains at least either a urethane resin or an acrylic resin.

When the non-white ink contains a diene copolymer and at least either an urethane resin or an acrylic resin, as described above, the non-white ink can prevent the resulting image from cracking and can be stably ejected. In such a non-white ink, the diene copolymer, probably, acts as a binder that binds the molecules of the urethane resin (or acrylic resin) to each other.

The properties of the binder resin contained in at least either the white ink or the non-white ink will now be described. It is desirable that the binder resin form a film in a range of temperatures (15 to 35° C.) at which ink jet recording is generally performed. Accordingly, the glass transition temperature (Tg) of the binder resin is preferably −10° C. or less, and more preferably −15° C. or less. When the binder resin has a glass transition temperature Tg in such a range, the pigment exhibits a still higher fixation in the recorded article and, thus, the rub fastness will be satisfactory. The lower limit of the glass transition temperature Tg is not particularly limited, and, for example, may be −50° C. or more.

The acid value of the binder resin is preferably 10 to 100 mg KOH/g, and more preferably 15 to 50 mg KOH/g. When the binder resin has an acid value of 100 mg KOH/g or less, the washing fastness of the resulting recorded article can be satisfactorily maintained. When the binder resin has an acid value of 10 mg KOH/g or more, the ink can be stably stored, and the color developability and fixability can be satisfactorily maintained on the recording medium.

The acid value mentioned herein is calculated from the following equation, using values measured with AT 610 manufactured by Kyoto Electronics Manufacturing Co., Ltd.:

$$\text{Acid value(mg/g)} = (EP1 - BL1) \times FA1 \times C1 \times K1 / SIZE$$

In the equation, EP1 represents the volume of titrant added (mL), BL1 represents the blank value (0.0 mL), the FA1 represents the factor of the titrant (1.00), C1 represents a concentration conversion factor (5.611 mg/mL) equivalent to 0.1 mol/L potassium hydroxide (KOH), K1 represents a coefficient, and SIZE represents the volume of analyte (g).

From the viewpoint of preventing ink layers from fracturing or cracking on an elastic recording medium such as cloth so as to ensure high washing fastness and rub fastness, the binder resin preferably has an elongation at break of 200% to 500% and an elastic modulus of 20 to 400 MPa.

The elongation at break mentioned herein is the value obtained by measuring a film of about 60 μm in thickness at a tensile test gauge length of 20 mm and a tension rate of 100 mm/min. The elastic modulus mentioned herein is the tensile elasticity obtained by measuring a dumbbell test specimen of 10 mm (width of the parallel portion) by 40 mm (length) formed from a film of about 60 μm in thickness in accordance with JIS K 7161: 1994.

JIS K 7161: 1994 is a standard titled "Plastics-Determination of tensile properties", corresponding to ISO 527-1: 1993, and specifies general principles for measuring tensile properties of plastics and plastic composites under prescribed conditions.

The D50 of the binder resin is preferably 30 to 300 nm, and more preferably 80 to 300 nm. A binder resin having a D50 in such an range can be uniformly dispersed in the white ink. The lower limit of the D50 is preferably 100 nm from the viewpoint of ensuring a still higher rub fastness.

Urethane resins having properties suitable as the above-described binder resin include, but are not limited to, Superflexes 460, 470, 610 and 700 (each product name, produced by Dai-ichi Kogyo Seiyaku Co., Ltd.), NeoRez R-9660, R-9637 and R-940 (each product name, produced by Kusumoto Chemicals, Ltd.), Adeka Bon-Tighters HUX-380 and 290K (each product name, produced by Adeka), Takelacs (registered trademark) W-605, W-635 and WS-6021 (each product name, produced by Mitsui Chemicals, Inc.), and Polyether (Tg=20° C.) produced by Taisei Finechemical Co,. Ltd.

An acrylic resin having properties suitable as the above-described binder resin can be, but is not limited to, Mowinyl-Powder 952A produced by Nippon Synthetic Chemical Industry Co., Ltd.

Glycol Ether

Preferably, the inks each contain a glycol ether. Glycol ether can prevent bleeding in the resulting recorded article. Preferred glycol ethers include, but are not limited to, diethylene glycol monobutyl ether, triethylene glycol monobutyl ether, propylene glycol monobutyl ether, and dipropylene glycol monobutyl ether. These may be used singly or in combination.

The glycol ether content is preferably 0.1% to 20% by mass, more preferably 0.5% to 10% by mass, relative to the total mass of the ink (100% by mass).

Surfactant

The inks of an embodiment of the invention preferably contain at least one surfactant selected from the group consisting of acetylene glycol-based surfactants, acetylene alcohol-based surfactants and polysiloxane-based surfactants. The addition of such a surfactant facilitates the drying of the resulting images such as printed characters, and allows high speed printing.

From the viewpoint of reducing the degree of bleeding and enhancing printing quality, the surfactant to be added to the ink is preferably at least either an acetylene glycol-based surfactant or an acetylene alcohol-based surfactant.

More specifically, preferred acetylene glycol-based surfactants and acetylene alcohol-based surfactants include, but are not limited to, 2,4,7,9-tetramethyl-5-decyne-4,7-diol and its alkylene oxide adducts, and 2,4-dimethyl-5-decyne-4-ol and its alkylene oxide adducts. These may be used singly or in combination. These surfactants are available as commercial products such as Olfine 104 series and Olfine E series such as Olfine E1010 (each product name, produced by Air Products and Chemicals Inc.) and Surfynol 465 and Surfynol 61 (each product name, produced by Nissin Chemical Industry CO., Ltd.).

Exemplary polysiloxane-based surfactants include BYK-347 and BYK-348 (each product name, produced by BYK).

The surfactant content is preferably 0.1% to 3% by mass relative to the total mass of the ink (100% by mass).

Water

The inks of an embodiment may contain 20% to 80% by mass of water relative to the total mass of the ink (100% by mass) from the viewpoint of adjusting the viscosity of the ink in an appropriate range.

Other Constituents

The inks may optionally contain a moisturizing agent, a solubilizing agent, a penetration control agent, a viscosity modifier, a pH adjuster, an antioxidant, a preservative, an antifungal agent, a chelate for capturing metal ions affecting the dispersion of the pigment, and other additives, from the viewpoint of maintaining the stability in storing the ink and in ejection from an ink jet head, and preventing clogging and degradation.

The ink set of an embodiment may further include a known ink other than the white ink and the non-white ink.

As described above, embodiments of the invention provide an ink set that can an achieve superior color developability. More specifically, the ink set includes a white ink jet pigment ink and a non-white ink jet pigment ink containing a diene copolymer, and can form non-white images exhibiting a high color developability.

Image Forming Method

The image forming method according to an embodiment of the invention includes forming an image on a recording medium with the ink set of an embodiment of the invention by an ink jet recording method.

More specifically, in the image forming method, the forming of an image preferably includes depositing the white ink on the recording medium to form a white ink layer and subsequently depositing the non-white ink on the white ink layer, and heating the recording medium on which the white ink and the non-white ink have been deposited.

The recording medium used in this image forming method may be cloth of natural fiber fabrics or synthetic fiber fabrics, such as silk, cotton, sheep wool, nylon, polyester, and rayon. For example, cotton is resistant to high temperatures at which inks are to be fixed, and is thus suitably used.

In the ink jet recording method, an ink jet recording apparatus charged with the inks of the ink set is used. The ink jet recording apparatus may be, but is not limited to, of drop-on-demand type. The drop-on-demand ink jet recording apparatus may adopt a piezoelectric recording technique using piezoelectric elements disposed in a recording head, a thermal jet recording technique using heaters of heat resistors disposed in a recording head, or other techniques, and any recording technique may be used.

Pretreatment

Before forming an image on a recording medium with the ink set, the recording medium is preferably coated with a pretreatment agent containing a flocculant. The flocculant may be at least one selected from the group consisting of organic acids and polyvalent metal salts. Exemplary organic acids include acetic acid, propionic acid, and lactic acid. Exemplary polyvalent metal salts include magnesium salts, calcium salts, and aluminum salts. The flocculant can aggregate pigment particles in the ink, and can precipitate water-dispersible resin (from a resin emulsion) to form an ink coating on the recording medium. Thus, it is desirable to pretreat the recording medium with a pretreatment agent. After coating the recording medium with the pretreatment agent, the recording medium is dried. The pretreatment may be performed by immersing the recording medium in the pretreatment agent, or applying or spraying the pretreatment agent to the recording medium, but the treatment process is not limited to these.

The pretreatment agent also may contain 0.01% to 20% by mass of a sizing agent such as water-soluble polymer. Examples of the sizing agent include, but are not limited to, starches of corn, wheat and the like, cellulose such as carboxymethyl cellulose and hydroxymethyl cellulose, polysaccharides such as sodium alginate, gum arabic, locust bean gum, trant gum, guar gum and tamarind seeds, protein such as gelatin and casein, water-soluble natural polymers such as tannin and lignin, and water-soluble synthetic polymers such as polyvinyl alcohol compounds, polyethylene oxide compounds, acrylic compounds and maleic anhydride compounds.

The pretreatment agent may further contain a moisturizing agent, such as urea or thiourea, a pH adjuster, an antireductant, a penetrant, a metal ion-blocking agent, an antifoaming agent, and other additives, if necessary.

The drying after coating the recording medium with the pretreatment agent is performed by heating for 2 minutes or less preferably at 110 to 200° C., more preferably at 120 to 180° C. By heating the recording medium at 110° C. or more, a high fixation of the ink or pigment can be ensured in the resulting recorded article. When the heating temperature is 200° C. or less, the degradation of the recording medium and the pigment and polymers in the ink can be prevented.

Ink Deposition

In the process step of depositing the inks, first, the white ink of the ink set is ejected to the surface of the recording medium (that may have been pretreated) to from a base coat image. Then, the non-white ink of the ink set is ejected to the base coat image to form a non-white image. In this instance, it is preferable that the non-white image be formed so as to cover substantially the entire surface of the base coat image, from the viewpoint of preventing the white base coat from being exposed. The ejection conditions of the white ink and the non-white ink can be appropriately set depending on the properties of the inks.

Preferably, the base coat is dried before depositing the non-white ink over the surface of the base coat. By drying the base coat, the base coat or white ink layer is prevented from being mixed with the subsequently formed non-white ink layer and thus being exposed. The drying can be performed under any conditions as long as the white ink can be dried.

Heating

The white ink and the non-white ink deposited on the recording medium are heated. By this heating operation, the resin (for example, urethane resin) in the white ink is fused with the base coat, and moisture is evaporated. Consequently, the rub fastness of the resulting image can be further enhanced.

The heating may be performed by, but not limited to, heat press, normal-pressure steaming, high-pressure steaming, or thermal fixing. The heat source for the heating may be, but is not limited to, infrared rays (lamp). The heating temperature can be a level at which the resin in the non-white ink can be fused, and at which moisture can be evaporated. Thus, it is, for example, about 150 to 200° C.

After the heating, the recorded article may be washed and dried. At this time, soaping treatment, that is, washing out the unfixed pigment with a heat soap solution, may be performed, if necessary.

A recorded article, such as a printed cloth, is thus produced in which an base coat of the white ink and an overlying image of the non-white ink are formed on a recording medium such as cloth. In the recorded article, cracks, unevenness and stain do not occur, and accordingly, the recorded article exhibits a high color developability. In addition, since the white ink layer and the non-white ink layer are satisfactorily fixed (having high adhesion), a high rub fastness can be exhibited.

EXAMPLES

The embodiment of the invention will now be further described in detail with reference to, but without limitation to, Examples.

Preparation of Pretreatment Agent

First, a pretreatment agent for pretreating the recording medium was prepared as below before forming an image. The content of each ingredient shown below represents the solid content of the ingredient.

A pretreatment agent (100% by mass in total) was prepared by mixing 15% by mass of calcium nitrate tetrahydrate, 0.2% by mass of polyacrylamide (ACRYPERSE M-2000A produced by Dia-Nitrix Co., Ltd.), 0.1% by mass of surfactant (BYK-348 produced by BYK), 10% by mass of Mowinyl-Powder 966A (produced by Nippon Synthetic Chemical Industry Co., Ltd.), and the balance of ion exchanged water.

Preparation of Inks

Materials Used

The following materials were mainly used in the Examples and Comparative Examples.

1. Pigment Dispersions

A white pigment dispersion was prepared as below. A white pigment dispersion (pigment content: 25%, simply represented by "W" in the tables) was prepared by mixing 250 g of titanium oxide "R62N" (produced by Sakai Chemical Industry Co., Ltd.), 10 g (active constituent: 2.5 g) of dispersant "DEMOL EP" (produced by Kao Corporation) and 740 g of ion exchanged water, and dispersing the materials of the mixture in a bead mill DYNO-MILL KDL A (manufactured by Shinmaru Enterprises Corporation) with zirconia beads of 0.5 mm in diameter at a filling factor of 80% and a retention time of 2 minutes.

A black pigment dispersion was prepared as below. Black carbon Monarch 880 (produced by Cabot) was used. After a reaction vessel equipped with a stirrer, a thermometer, a reflux tube and a dropping funnel was purged with nitrogen, 20 parts by mass of benzyl acrylate, 5 parts by mass of 2-ethylhexyl acrylate, 15 parts by mass of butyl acrylate, 10 parts by mass of lauryl acrylate, 2 parts by mass of acrylic acid, and 0.3 parts by mass of t-dodecyl mercaptan were mixed in the vessel. The mixture was heated at 70° C. Then, a separately prepared mixture of 150 parts by mass of benzyl acrylate, 15 parts by mass of acrylic acid, 50 parts by mass of butyl acrylate, 1 part by mass of t-dodecyl mercaptan, 20 parts by mass of methyl ethyl ketone and 1 part by mass of azobisisobutyronitrile was dropped to the reaction vessel from a dropping funnel over a period of 4 hours, and thus a dispersant polymer was polymerized. Subsequently, methyl ethyl ketone was added into the reaction vessel to prepare a solution containing 40% by mass of the dispersing polymer. The polydispersity (Mw/Mn) of the dispersant polymer was 3.1.

The weight average molecular weight (Mw) was measured as described above. The number average molecular weight (Mn) was measured as a polystyrene-equivalent number average molecular weight by gel permeation chromatography (GPC), as in the measurement of weight average molecular weight (Mw).

Then, 40 parts by mass of the dispersant polymer solution, 30 parts by mass of carbon black, Monarch 880 (produced by Cabot), 100 parts by mass of 0.1 mol/L sodium hydroxide aqueous solution, and 30 parts by mass of methyl ethyl ketone were mixed, and the mixture was stirred with a homogenizer for 30 minutes. Then, 300 parts by mass of ion exchanged water was added to the resulting dispersion, followed by stirring for another one hour. Then, the entirety of methyl ethyl ketone and part of water were evaporated in a rotary evaporator, and the pH was adjusted to 9 with 0.1 mol/L sodium hydroxide solution. The dispersion was then filtered through a 0.3 µm membrane filter. A black pigment dispersion (simply represented by "K" in the tables) containing 20% by mass of solid content (dispersant polymer and carbon black) was thus prepared.

A cyan pigment dispersion (simply represented by "C" in the tables) was prepared in the same manner as the black pigment dispersion, except that Pigment Blue 15:3 (copper phthalocyanine pigment produced by Clariant) was used as the pigment, and cyclohexyl acrylate was used instead of benzyl acrylate for synthesizing the dispersant polymer. The polydispersity (Mw/Mn) of the dispersant polymer used in the cyan pigment dispersion was 3.0.

A magenta pigment dispersion (simply represented by "M" in the tables) was prepared in the same manner as the black pigment dispersion, except that Pigment Red 122 (dimethylquinacridone pigment produced by Clariant) was used as the pigment, and cyclohexyl acrylate was used instead of benzyl acrylate for synthesizing the dispersant polymer. The polydispersity (Mw/Mn) of the dispersant polymer used in the magenta pigment dispersion was 3.0.

A yellow pigment dispersion (simply represented by "Y" in the tables) was prepared in the same manner as the black pigment dispersion, except that Pigment Yellow 180 (diketopyrrolopyrrole produced by Clariant) was used as the pigment, and cyclohexyl acrylate was used instead of benzyl acrylate for synthesizing the dispersant polymer. The polydispersity (Mw/Mn) of the dispersant polymer used in the yellow pigment dispersion was 3.5.

2. Diene Copolymer
   Styrene-butadiene rubber: SR-100 (produced by NIPPON A & L INC.), hereinafter referred to as "SBR"
   Acrylonitrile-butadiene rubber: NA-11 (produced by NIPPON A & L INC.), hereinafter referred to as "NBR"
   Methyl methacrylate-butadiene rubber: MR-170 (produced by NIPPON A & L INC.), hereinafter referred to as "MBR"
3. Binder Resin
   Urethane resin: Takelac W-605 (produced by Mitsui Chemicals, Inc.)
   Acrylic resin: Mowinyl-Powder 952A (produce by Nippon Synthetic Chemical Industry Co., Ltd.)
4. Surfactant
   BYK-348 (product name, produced by BYK)
5. Glycol Ether
   HIGH SOLVE DB (product name, produced by Toho Chemical Industry Co., Ltd.)
6. Moisturizing Agent
   Glycerol (produced by Sakamoto Yakuhin Kogyo Co., Ltd.)

Preparation of White Ink

The pigment dispersion, the binder resins, the surfactant, the glycol ether, the moisturizing agent, and ion exchanged water were mixed and stirred according to the compositions (unit: percent by mass, mass %) shown in Tables 1 and 2. The resulting liquid was filtered through a filter of 5 μm in pore size and was then deaerated with a vacuum pump. Thus, white inks of Examples and Comparative Examples were prepared.

Preparation of Non-White Ink

The pigment dispersion, the binder resins, the diene copolymer, the surfactant, the glycol ether, the moisturizing agent, and ion exchanged water were mixed and stirred according to the compositions (unit: percent by mass, mass %) shown in Tables 3 and 4. The resulting liquid was filtered through a filter of 5 μm in pore size and was then deaerated with a vacuum pump. Thus, non-white inks of Examples and Comparative Examples were prepared.

TABLE 1

| White ink composition | Example 1 | Example 2 | Example 3 | Example 4 | Example 5 | Example 6 | Example 7 | Example 8 | Example 9 |
|---|---|---|---|---|---|---|---|---|---|
| Pigment | (W) 10 | (W) 10 | (W) 10 | (W) 10 | (W) 10 | (W) 10 | (W) 10 | (W) 10 | (W) 10 |
| Urethane resin | — | — | — | — | 10 | 10 | 10 | 10 | 10 |
| Acrylic resin | — | — | — | — | — | — | — | — | — |
| Surfactant | 0.5 | 0.5 | 0.5 | 0.5 | 0.5 | 0.5 | 0.5 | 0.5 | 0.5 |
| Glycol ether | 1 | 1 | 1 | 1 | 1 | 1 | 1 | 1 | 1 |
| Moisturizing agent | 10 | 10 | 10 | 10 | 10 | 10 | 10 | 10 | 10 |
| Ion-exchanged water | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 |

TABLE 2

| White ink composition | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| Pigment | (W) 10 | (W) 10 | (W) 10 | (W) 10 | (W) 10 | (W) 10 | (W) 10 | (W) 10 | (W) 10 |
| SBR | — | — | — | — | — | — | — | 3 | 4 |
| Urethane resin | 10 | 10 | 10 | 10 | — | 3 | — | — | — |
| Acrylic resin | — | — | — | — | — | — | 3 | — | — |
| Surfactant | 0.5 | 0.5 | 0.5 | 0.5 | 0.5 | 0.5 | 0.5 | 0.5 | 0.5 |
| Glycol ether | 1 | 1 | 1 | 1 | 1 | 1 | 1 | 1 | 1 |

TABLE 2-continued

| White ink composition | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| Moisturizing agent | 10 | 10 | 10 | 10 | 10 | 10 | 10 | 10 | 10 |
| Ion-exchanged water | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 |

TABLE 3

| Non-white ink composition | Example 1 | Example 2 | Example 3 | Example 4 | Example 5 | Example 6 | Example 7 | Example 8 | Example 9 |
|---|---|---|---|---|---|---|---|---|---|
| Pigment | (C) 3.5 | (C) 3.5 | (C) 3.5 | (C) 3.5 | (C) 3.5 | (C) 3.5 | (Y) 3.5 | (M) 3.5 | (K) 3.5 |
| SBR | 3 | — | — | — | — | — | — | — | — |
| NBR | — | 3 | — | — | — | — | — | — | — |
| MBR | — | — | 3 | 1 | 1 | 0.5 | 0.5 | 0.5 | 0.5 |
| Urethane resin | — | — | — | — | 6 | 6 | 6 | 6 | 6 |
| Acrylic resin | — | — | — | — | — | — | — | — | — |
| Surfactant | 0.5 | 0.5 | 0.5 | 0.5 | 0.5 | 0.5 | 0.5 | 0.5 | 0.5 |
| Glycol ether | 1 | 1 | 1 | 1 | 1 | 1 | 1 | 1 | 1 |
| Moisturizing agent | 10 | 10 | 10 | 10 | 10 | 10 | 10 | 10 | 10 |
| Ion-exchanged water | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 |

TABLE 4

| Non-white ink composition | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| Pigment | (C) 3.5 | (Y) 3.5 | (M) 3.5 | (K) 3.5 | (C) 3.5 | (C) 3.5 | (C) 3.5 | (C) 3.5 | (C) 3.5 |
| SBR | — | — | — | — | — | — | — | — | — |
| NBR | — | — | — | — | — | — | — | — | — |
| MBR | 0.5 | 0.5 | 0.5 | 0.5 | — | — | — | — | — |
| Urethane resin | — | — | — | — | — | — | — | — | 3 |
| Acrylic resin | 6 | 6 | 6 | 6 | — | — | — | — | — |
| Surfactant | 0.5 | 0.5 | 0.5 | 0.5 | 0.5 | 0.5 | 0.5 | 0.5 | 0.5 |
| Glycol ether | 1 | 1 | 1 | 1 | 1 | 1 | 1 | 1 | 1 |
| Moisturizing agent | 10 | 10 | 10 | 10 | 10 | 10 | 10 | 10 | 10 |
| Ion-exchanged water | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 |

Preparation of Printed Cloth

Pretreatment

A T-shirt made of 100% cotton was used as a recording medium of cloth, and the pretreatment agent was applied to the T-shirt. Then, the T-shirt was heat-treated (dried) at 160° C. for 1 minute.

Ink Deposition

Subsequently, inks were deposited onto the cloth, using an ink jet recording apparatus EPSON MJ-3000C (manufactured by Seiko Epson Corporation). More specifically, a base coat of the white ink was formed on the cloth by printing with the white ink. Subsequently, overlying layers were formed over the surface of the white base coat by printing with the non-white inks.

Heat Treatment

The resulting cloth, having the overlying layers, was subjected to heat treatment at 160° C. for 1 minute to yield a printed cloth having an image on the cloth.

Evaluation of Printed Cloths

Each of the printed cloths prepared above was evaluated as below.

Color Developability

The color developability was evaluated by visually observing the surface state of the printed cloth. The evaluation criteria were as follows: The results are shown in Tables 5 and 6.

AA: The printed cloth was glossy and its surface was in such a state that the white base coat was not exposed.

A: The printed cloth was not glossy but its surface was in such a state that the white base coat was not exposed.

B: The surface of the printed cloth was in a state in which the white base coat was exposed in 30% or less of the area of the base coat.

C: The surface of the printed cloth was in a state in which the white base coat was exposed in over 30% of the area of the base coat.

Rub Fastness

The printed cloth was subjected to tests to evaluate the rub fatness in the dry and wet modes in accordance with JIS L 0849, using a Gakushin-type rubbing tester (rubbing tester II specified in JIS L 0849) AB-301 (manufacture by Tester Sangyo) with cotton standard adjacent fabrics for color fastness test (in accordance with JIS L 0803, code No. 670101 available from Japan Standard Association) as an opposing cloth. Then, fixation (optical density (OD value) of the opposing cloth/initial OD value of the printed cloth) was calculated from the results. The evaluation criteria were as follows: The results are shown in Tables 5 and 6.

A: Fixation was 98% or more.
B: Fixation was 90% or more and less than 98%.
C: Fixation was 85% or more and less than 90%.
D: Fixation was less than 85%.

TABLE 5

| | Example 1 | Example 2 | Example 3 | Example 4 | Example 5 | Example 6 | Example 7 | Example 8 | Example 9 |
|---|---|---|---|---|---|---|---|---|---|
| Color developability | B | B | A | AA | AA | AA | AA | AA | AA |
| Rub fastness | B | B | B | B | A | A | A | A | A |

TABLE 6

| | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| Color developability | AA | AA | AA | AA | C | C | C | C | D |
| Rub fastness | A | A | A | A | D | B | C | C | C |

The evaluation results show that the ink sets of the Examples, including a white ink and a non-white ink containing a diene copolymer, led to higher color developability and rub fastness than other ink sets (Comparative Examples). Furthermore, it has been shown that the ink sets whose white ink and non-white each contain a binder resin led to excellent color developability and rub fastness.

What is claimed is:

1. An ink set comprising:
  a white ink jet pigment ink; and
  a non-white ink jet pigment ink containing a diene copolymer,
  wherein the white ink jet pigment ink contains a urethane resin and the non-white ink jet pigment ink contains at least one of a urethane resin or an acrylic resin,
  wherein the urethane resin and the acrylic resin have an elongation at break of 200% to 500%, an elastic modulus of 20 to 400 MPa, and a glass transition temperature of −10° C. or less.

2. The ink set according to claim 1, wherein the diene copolymer content in the non-white ink jet pigment ink is 0.5% to 3% by mass relative to the total mass of the non-white ink jet pigment ink.

3. The ink set according to claim 1, wherein the diene copolymer is methylmethacrylate-butadiene rubber.

4. An image forming method comprising:
  forming an image on a recording medium with the ink set as set forth in claim 1, by an ink jet recording method.

5. An image forming method comprising:
  forming an image on a recording medium with the ink set as set forth in claim 2, by an ink jet recording method.

6. An image forming method comprising:
  forming an image on a recording medium with the ink set as set forth in claim 3, by an ink jet recording method.

7. The image forming method according to claim 4, wherein the forming of an image includes depositing the white ink jet pigment ink on a recording medium to form a white ink layer and subsequently depositing the non-white ink jet pigment ink on the white ink layer, and heating the recording medium on which the white ink jet pigment ink and the non-white ink jet pigment ink have been deposited.

8. An ink set comprising:
  a white ink jet pigment ink; and
  a non-white ink jet pigment ink containing a diene copolymer,
  wherein at least one of the white ink jet pigment ink and the non-white ink jet pigment ink contains at least one of a urethane resin and an acrylic resin,
  wherein the urethane resin and the acrylic resin have an elongation at break of 200% to 500%, an elastic modulus of 20 to 400 MPa, and a glass transition temperature of −10° C. or less.

9. An image forming method comprising:
  forming an image on a recording medium with the ink set as set forth in claim 8, by an ink jet recording method.

* * * * *